United States Patent
Yakumaru et al.

(10) Patent No.: US 9,843,061 B2
(45) Date of Patent: Dec. 12, 2017

(54) HYDROGEN GENERATOR WITH A SUPPLEMENTARY AIR FLOW RATE ADJUSTOR FOR A COMBUSTOR

(71) Applicant: Panasonic Intellectual Property Management Co., Ltd., Osaka (JP)

(72) Inventors: Yuuichi Yakumaru, Osaka (JP); Kunihiro Ukai, Nara (JP); Susumu Kobayashi, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 104 days.

(21) Appl. No.: 14/407,932

(22) PCT Filed: Mar. 19, 2014

(86) PCT No.: PCT/JP2014/001589
§ 371 (c)(1),
(2) Date: Dec. 12, 2014

(87) PCT Pub. No.: WO2014/162676
PCT Pub. Date: Oct. 9, 2014

(65) Prior Publication Data
US 2015/0155579 A1    Jun. 4, 2015

(30) Foreign Application Priority Data

Apr. 5, 2013    (JP) .................................. 2013-079974

(51) Int. Cl.
*B01J 7/00*    (2006.01)
*H01M 8/0612*    (2016.01)
(Continued)

(52) U.S. Cl.
CPC ....... *H01M 8/0618* (2013.01); *B01J 19/0006* (2013.01); *C01B 3/02* (2013.01);
(Continued)

(58) Field of Classification Search
CPC combination set(s) only.
See application file for complete search history.

(56) References Cited

U.S. PATENT DOCUMENTS 3,915,125 A * 10/1975 Henkel .................. F02M 27/02
123/3
4,147,136 A * 4/1979 Noguchi ................ F02B 43/08
123/3
(Continued)

FOREIGN PATENT DOCUMENTS

JP    2006-105480 A    4/2006
JP    2006-278108 A    10/2006
(Continued)

OTHER PUBLICATIONS

International Search Report issued in International Application No. PCT/JP2014/001589 dated Jun. 24, 2014, with English translation.
(Continued)

*Primary Examiner* — Imran Akram
(74) *Attorney, Agent, or Firm* — McDermott Will & Emery LLP

(57) ABSTRACT

A hydrogen generator includes: a reformer configured to generate a hydrogen-containing gas by a reforming reaction of a material gas; a combustor configured to heat the reformer by diffusion combustion of the material gas and combustion air; a supplementary air flow rate adjuster configured to adjust the flow rate of supplementary air added to the material gas; and a controller configured to control the supplementary air flow rate adjuster such that the flow rate of a mixture gas of the material gas and the supplementary air becomes a predetermined value.

7 Claims, 8 Drawing Sheets

(51) Int. Cl.
  *C01B 3/38* (2006.01)
  *B01J 19/00* (2006.01)
  *C01B 3/02* (2006.01)

(52) U.S. Cl.
  CPC ..... *C01B 3/384* (2013.01); *B01J 2219/00164* (2013.01); *C01B 2203/0233* (2013.01); *C01B 2203/0811* (2013.01); *C01B 2203/107* (2013.01); *C01B 2203/1058* (2013.01); *C01B 2203/1064* (2013.01); *C01B 2203/1695* (2013.01)

(56) References Cited

U.S. PATENT DOCUMENTS

| | | | |
|---|---|---|---|
| 6,306,531 B1 | 10/2001 | Clingerman et al. | |
| 2001/0014414 A1* | 8/2001 | Okamoto | C01B 3/38 429/415 |
| 2002/0170504 A1 | 11/2002 | Kasahara et al. | |
| 2003/0093949 A1* | 5/2003 | Goebel | B01B 1/005 48/127.9 |
| 2005/0081514 A1* | 4/2005 | Nakada | F01N 3/22 60/286 |
| 2005/0132649 A1* | 6/2005 | Tamura | B01J 8/0278 48/197 R |
| 2005/0175532 A1* | 8/2005 | Yamaguchi | B01J 19/0013 423/652 |
| 2010/0015039 A1* | 1/2010 | Doshi | B01J 8/0278 423/652 |
| 2010/0193741 A1 | 8/2010 | Meissner et al. | |
| 2010/0304235 A1 | 12/2010 | Shigezumi et al. | |
| 2011/0212375 A1* | 9/2011 | Taguchi | C01B 3/38 429/425 |
| 2012/0078408 A1* | 3/2012 | Li | C01B 3/384 700/105 |
| 2012/0126177 A1 | 5/2012 | Meissner et al. | |
| 2016/0017802 A1* | 1/2016 | Saloway | F02C 6/10 60/780 |

FOREIGN PATENT DOCUMENTS

| | | |
|---|---|---|
| JP | 2008-135268 A | 6/2008 |
| JP | 2010-108832 A | 5/2010 |
| RU | 2350839 C1 | 3/2009 |

OTHER PUBLICATIONS

W. Mitianiec, "Factors Determing Ignition and Efficient Combustion in Modern Engines Operating on Gaseous Fuels," Internal Combustion Engines, Nov. 14, 2012, pp. 1-34.

Extended European Search Report issued in Application No. 14779593.4 dated Mar. 21, 2016.

* cited by examiner

HYDROGEN GENERATOR WITH A SUPPLEMENTARY AIR FLOW RATE ADJUSTOR FOR A COMBUSTOR

RELATED APPLICATIONS

This application is the U.S. National Phase under 35 U.S.C. §371 of International Application No. PCT/JP2014/001589, filed on Mar. 19, 2014, which in turn claims the benefit of Japan Application No. 2013-079974, filed on Apr. 5, 2013, the disclosures of which Applications are incorporated by reference herein.

TECHNICAL FIELD

The present invention relates to a hydrogen generator.

BACKGROUND ART

A fuel cell system is a system in which: a hydrogen-containing gas and an oxygen-containing gas are supplied to a fuel cell that is a main body of a power generating portion; an electrochemical reaction between hydrogen and oxygen proceeds; and chemical energy generated by this reaction is taken out as electric energy. Since the fuel cell system can perform the highly efficient electric power generation, and heat energy generated during the electric power generating operation can be easily utilized, the fuel cell system has been developed and commercialized as a distributed power generation system capable of realizing high energy use efficiency.

Since a hydrogen-containing gas infrastructure has not been developed in many cases, the fuel cell system is provided with a hydrogen generator including a reformer configured to generate a hydrogen-containing gas. At the time of start-up, the reformer is heated by a combustor, such as a burner, by using a city gas, a LPG, or the like, supplied from an existing infrastructure, as combustion fuel. With this, the hydrogen-containing gas is generated by reforming a raw material, such as the city gas or the LPG, by using a Ru catalyst or Ni catalyst of the reformer at a temperature (for example, about 600° C. to 700° C.) appropriate for a reforming reaction. After the start-up, the combustor continues the combustion by using a part of the city gas, the LPG, or the like or an unreacted hydrogen-containing gas (so-called off gas) discharged from the fuel cell.

In the hydrogen generator configured to perform the reforming reaction by using, as a material gas, the city gas, the LPG, or the like, supplied from the existing infrastructure, the combustor needs to be stably ignited at the time of the start-up and also needs to stably continue a flame holding state after the ignition.

Generally used for the ignition of the combustor at the time of the start-up is a method of diffusing a predetermined amount of material gas and combustion air in the combustor and generating sparks by an ignitor or the like provided at the combustor.

However, the specific gravity of propane is about 2.76 times the specific gravity of the city gas, and the specific gravity of the butane is 3.63 times the specific gravity of the city gas. Therefore, in a case where the mass flow rate is the same, the flow velocity of the propane is 0.36 time the flow velocity of the city gas, and the flow velocity of the butane is 0.28 time the flow velocity of the city gas. To be specific, in the case of using the propane and the butane as the combustion fuel of the combustor, because of the low flow velocities of the propane and the butane, the combustion fuel hardly diffuses in the combustor, and the stable ignition of the combustor by the mixing of the combustion air and an appropriate amount of combustion fuel becomes difficult in some cases.

Here, PTL 1 proposes a method of, when the combustor hardly ignites, facilitating the ignition of the combustor by increasing the amount of material gas supplied to the combustor to increase the concentration of the material gas supplied to the combustor.

CITATION LIST

Patent Literature

PTL 1: Japanese Laid-Open Patent Application Publication No. 2010-277843

SUMMARY OF INVENTION

Technical Problem

However, PTL 1 does not adequately study influences on the combustor in a case where the concentration of the material gas supplied to the combustor becomes high.

One aspect of the present invention was made in consideration of these circumstances, and an object of the present invention is to provide a hydrogen generator capable of more stably performing the ignition of the combustor than before.

Solution to Problem

To solve the above problem, a hydrogen generator according to one aspect of the present invention includes: a reformer configured to generate a hydrogen-containing gas by a reforming reaction of a material gas; a combustor configured to heat the reformer by diffusion combustion of the material gas and combustion air; a supplementary air flow rate adjuster configured to adjust a flow rate of supplementary air added to the material gas; and a controller configured to control the supplementary air flow rate adjuster such that the volume flow rate of a mixture gas of the material gas and the supplementary air becomes a predetermined value.

The above object, other objects, features, and advantages of the present invention will be made clear by the following detailed explanation of preferred embodiments with reference to the attached drawings.

Advantageous Effects of Invention

The hydrogen generator according to one aspect of the present invention can more stably perform the ignition of the combustor than before.

DESCRIPTION OF EMBODIMENTS

Figure 1:
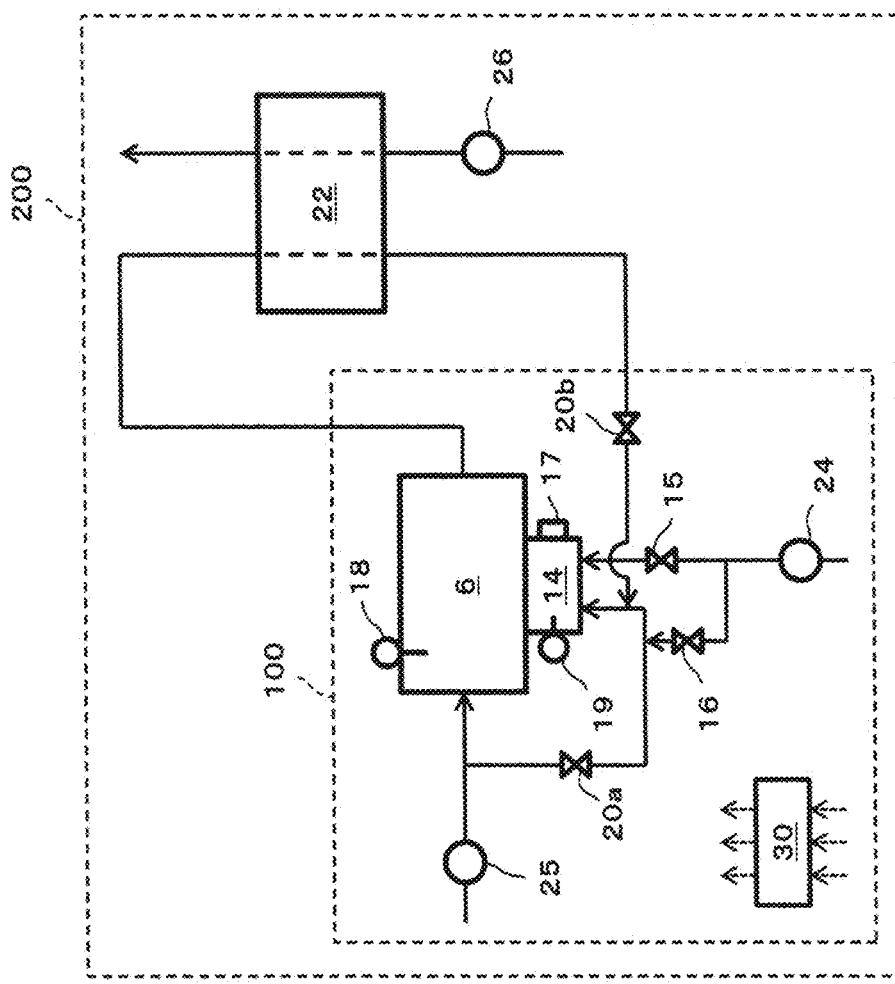
FIG. 1 is a block diagram showing one example of a fuel cell system of Embodiment 1.

The present inventors have diligently studied influences on a combustor in a case where the concentration of a material gas supplied to the combustor becomes high, and obtained the following findings.

In a case where the amount of material gas supplied is increased as in PTL 1, the material gas concentration becomes high, so that the material gas easily diffuses in the combustor. However, in a case where the material gas concentration becomes high, the material gas may not be stably mixed with the combustion air in the combustor. In such a case, the ignitability of the combustor may become unstable. In addition, because of the supply shortage of the oxygen, carbon monoxide may be easily generated.

Therefore, a hydrogen generator of a first aspect of the present invention includes: a reformer configured to generate a hydrogen-containing gas by a reforming reaction of a material gas; a combustor configured to heat the reformer by diffusion combustion of the material gas and combustion air; a supplementary air flow rate adjuster configured to adjust a flow rate of supplementary air added to the material gas; and a controller configured to control the supplementary air flow rate adjuster such that the flow rate of a mixture gas of the material gas and the supplementary air becomes a predetermined value.

According to the above configuration, the ignition of the combustor can be more stably performed than before. To be specific, since an appropriate amount of supplementary air is added to the material gas, the apparent flow velocity of the material gas supplied to the combustor can be increased without increasing the concentration of the material gas supplied to the combustor. Therefore, the diffusivity of the material gas to the combustor improves, so that the ignition of the combustor can be stably performed.

The hydrogen generator of a second aspect of the present invention is configured such that the hydrogen generator of the first aspect further includes a first detector used to detect composition of the material gas, wherein the controller controls the supplementary air flow rate adjuster based on the composition of the material gas.

According to the above configuration, since the flow rate of the air to the combustor can be controlled to become an optimal value corresponding to the composition of the material gas, the ignition of the combustor can be stably performed.

The hydrogen generator of a third aspect of the present invention is configured such that in the hydrogen generator of the first aspect or the second aspect, in a case where the combustor did not ignite at the time of start-up, the controller controls the supplementary air flow rate adjuster so as to stepwisely increase the flow rate of the supplementary air.

According to the above configuration, by stepwisely increasing the flow rate of the supplementary air, the diffusivity of the material gas to the combustor further improves, so that the ignition of the combustor can be stably performed.

The hydrogen generator of a fourth aspect of the present invention is configured such that the hydrogen generator of the first aspect further includes: a first detector used to detect composition of the material gas; and a second detector configured to detect a temperature inside the combustor, wherein the controller obtains an ignition determination temperature based on the composition of the material gas and then determines whether or not the combustor has ignited, based on a comparison between the temperature detected by the second detector and the ignition determination temperature.

According to the above configuration, whether or not the combustor has ignited is determined based on the comparison between the temperature detected by the second detector and the ignition determination temperature. Therefore, even in a case where the composition of the material gas changes, the reliability of the ignition determination of the combustor can be maintained.

Hereinafter, specific examples of embodiments will be explained in reference to the drawings. In the following explanations and drawings, the same reference signs are used for the same or corresponding components, and a repetition of the same explanation may be avoided.

Embodiment 1

Device Configuration

FIG. 1 is a block diagram showing one example of a fuel cell system of Embodiment 1.

As shown in FIG. 1, a fuel cell system 200 includes a hydrogen generator 100, a cathode air supply unit 26, and a fuel cell 22. The hydrogen generator 100 includes a reformer 6, a combustor 14, a combustion air flow rate adjuster 15, a supplementary air flow rate adjuster 16, an ignitor 17, a first detector 18, a second detector 19, a first switching unit 20a, a second switching unit 20b, an air supply unit 24, a material gas supply unit 25, and a controller 30.

The reformer 6 generates a hydrogen-containing gas by a reforming reaction of a material gas. The reforming reaction may be any type, and examples thereof include a steam-reforming reaction, an autothermal reaction, and a partial oxidation reaction. Although not shown in FIG. 1, devices required for respective reforming reactions are suitably provided. For example, in a case where the reforming reaction is the steam-reforming reaction, an evaporator configured to generate steam and a water supply unit configured to supply water to the evaporator are provided in addition to the combustor 14 configured to heat the reformer. In a case where the reforming reaction is the autothermal reaction, the hydrogen generator 100 further includes an air supply unit configured to supply air to the reformer. The material gas is a gas, such as a LPG, containing an organic compound constituted by at least carbon and hydrogen.

Used in the reformer 6 is, for example, a spherical reforming catalyst in which an alumina carrier supports metal ruthenium. However, the present embodiment is not limited to this. In addition to the above, a nickel catalyst, a platinum-based catalyst, a platinum group-based catalyst (such as rhodium), or the like may be used as the reforming catalyst. The shape of the reforming catalyst may be a cylindrical shape or the like instead of the spherical shape.

The material gas supply unit 25 supplies the material gas to the reformer 6. For example, the material gas supply unit 25 is constituted by a booster and a flow rate control valve.

However, the material gas supply unit 25 may be constituted by one of the booster and the flow rate control valve. One example of the booster is a fixed displacement pump, but the booster is not limited to this. The material gas is supplied from a material gas supply source. The material gas supply source has predetermined supply pressure and is, for example, an LPG bomb. A desulfurizer configured to remove sulfur component in the material gas may be provided on a material gas passage extending between the material gas supply unit 25 and the reformer 6. Examples of the desulfurizer include a hydro-desulfurizer and a normal-temperature absorbent desulfurizer.

The air supply unit 24 supplies the air to the combustor 14. One example of the air supply unit 24 is an air fan, but the air supply unit 24 is not limited to this.

The combustor 14 heats the reformer 6 by diffusion combustion of the material gas and the combustion air. Specifically, the reforming catalyst in the reformer 6 is heated by the diffusion combustion in a burner portion of the combustor 14 to a temperature (for example, about 600° C. to 700° C.) appropriate for the reforming reaction. The combustion fuel of the combustor 14 may be any fuel. In the present embodiment, the material gas from the material gas supply unit 25 is used at the time of the start-up, and the off gas from the fuel cell 22 is used during the operation.

The combustion air flow rate adjuster 15 is provided on an air passage extending between the air supply unit 24 and the combustor 14. With this, the flow rate of the combustion air from the air supply unit 24 to the combustor 14 is adjusted. The combustion air flow rate adjuster 15 may have any configuration as long as it can adjust the flow rate of the combustion air flowing through the air passage. One example of the combustion air flow rate adjuster 15 is a flow rate control valve.

The first switching unit 20a is provided on a material gas branch passage branching from the material gas passage, extending between the material gas supply unit 25 and the reformer 6, to reach the combustor 14. The supply and supply stop of the material gas from the material gas supply unit 25 to the combustor 14 are performed by opening and closing of the first switching unit 20a. The first switching unit 20a may have any configuration as long as it can open and close the material gas branch passage. One example of the first switching unit 20a is an on-off valve.

The supplementary air flow rate adjuster 16 is provided on an air branch passage branching from the air passage, extending between the air supply unit 24 and the combustor 14, to reach the material gas branch passage. With this, the flow rate of the supplementary air from the air supply unit 24 to the material gas branch passage is adjusted. The supplementary air flow rate adjuster 16 may have any configuration as long as it can adjust the flow rate of the supplementary air flowing through the air branch passage. One example of the supplementary air flow rate adjuster 16 is a flow rate control valve.

The second switching unit 20b is provided on an off gas passage extending between an anode of the fuel cell 22 and the material gas branch passage located downstream of the first switching unit 20a. The supply and supply stop of the off gas from the anode of the fuel cell 22 to the combustor 14 are performed by opening and closing of the second switching unit 20b. The second switching unit 20b may have any configuration as long as it can open and close the off gas passage. One example of the second switching unit 20b is an on-off valve.

The ignitor 17 ignites the combustor 14. Specifically, the ignitor 17 is used as an ignition source that ignites a mixture gas of the combustion fuel and the combustion air in the combustor 14. The ignitor 17 may have any configuration as long as it can ignite the combustor 14. One example of the ignitor 17 is an igniter (spark plug).

The first detector 18 is used to estimate the composition of the material gas. In the present embodiment, a temperature detector 18 configured to directly or indirectly detect the temperature of the reformer 6 is used as the first detector 18. Details will be described later.

The temperature detector 18 may have any configuration as long as it can detect the temperature of the reformer 6. One example of the temperature detector 18 is a thermocouple. As shown in FIG. 1, the temperature detector 18 may be directly attached to the reformer 6. Since the temperature of the reformer 6 becomes high (for example, not lower than 600° C.), the temperature detector may be attached so as to be separated from the reformer 6. To be specific, the temperature detector 18 may directly or indirectly detect the temperature of the reformer 6.

The second detector 19 detects a combustion state of the combustor 14. Specifically, the second detector 19 is used to detect whether or not the combustor 14 has ignited, whether or not the combustor 14 is in a flame holding state, and the like. The second detector 19 may have any configuration as long as it can detect the combustion state of the combustor 14. Examples of the second detector 19 include a flame rod and a thermocouple.

The controller 30 controls the supplementary air flow rate adjuster 16 such that the flow rate of the mixture gas of the material gas and the supplementary air becomes a predetermined value. The controller 30 estimates the composition of the material gas based on the temperature detected by the temperature detector 18. The controller 30 controls the supplementary air flow rate adjuster 16 based on the composition of the material gas.

The controller 30 may have any configuration as long as it has a control function. For example, the controller 30 may include a calculation processing portion and a storage portion storing control programs. Examples of the controller 30 include a microcontroller and a PLC (Programmable Logic Controller). Examples of the calculation processing portion include a MPU and a CPU. One example of the storage portion is a memory. The controller 30 may be constituted by a single controller or a plurality of controllers.

The fuel cell 22 generates electric power using the hydrogen-containing gas supplied from the hydrogen generator 100. Specifically, the fuel cell 22 generates electric power and heat by a chemical reaction between oxygen in the air supplied from the cathode air supply unit 26, such as a blower, and hydrogen in the hydrogen-containing gas. The off gas from the fuel cell 22 is combusted in the combustor 14 as described above, and a flue gas from the combustor 14 flows through a flue gas passage to be discharged to the outside of the fuel cell system 200. The fuel cell 22 may be any type, and examples thereof include a polymer electrolyte fuel cell, a solid-oxide fuel cell, and a phosphoric-acid fuel cell. In a case where the fuel cell 22 is the solid-oxide fuel cell, the reformer 6 and the fuel cell 22 are built into a single case.

Figure 2:
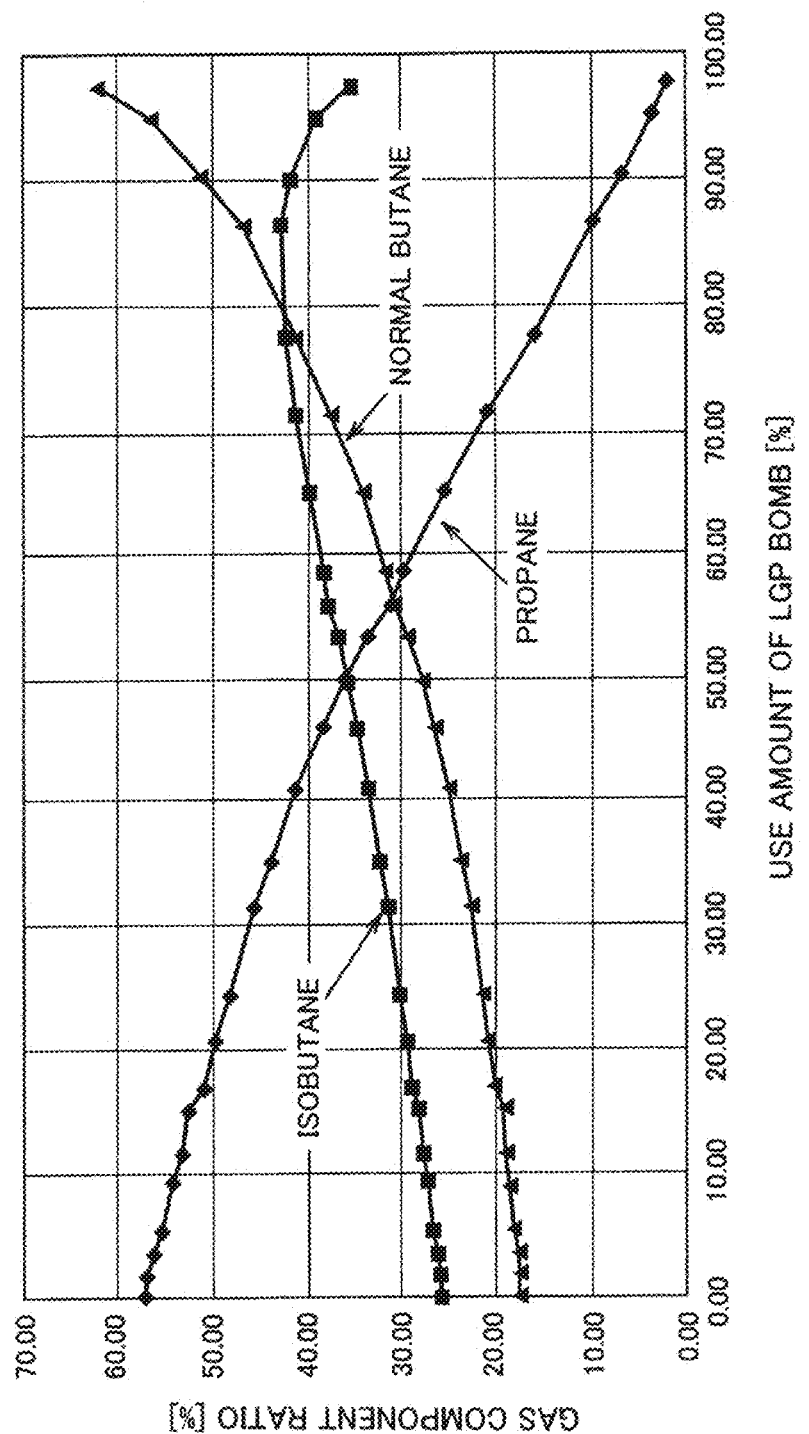
FIG. 2 is a diagram showing one example of a relationship between the use amount of a LPG bomb and the composition of a material gas.

Relationship Between Temperature of Reformer and Composition of Material Gas at the Time of Start-Up FIG. 2 is a diagram showing one example of a relationship between the use amount of the LPG bomb and the composition of the material gas. This example shows a case where a mixture gas constituted by propane, isobutane, and normal butane is sealed in the LPG bomb. A horizontal axis of FIG. 2 shows the use amount (%) of the LPG bomb, and a vertical axis of FIG. 2 shows component ratios (%) of the mixture gas constituted by propane, isobutane, and normal butane.

In the LPG bomb, a gas with low boiling point evaporates more easily than a gas with high boiling point. Therefore, as shown in FIG. 2, when the use amount of the LPG bomb is small, that is, immediately after the start of the use of the LPG bomb, the component ratio of the propane that is low in boiling point is high. As the use amount of the LPG bomb increases, the component ratio of the propane in the mixture gas quickly decreases. In contrast, in the mixture gas, the component ratios of the isobutane and normal butane that are higher in boiling point than the propane become high as the use amount of the LPG bomb increases.

It is clear from the above that the component ratios of the combustible gases contained in the mixture gas change in accordance with the use amount of the LPG bomb (i.e., the remaining amount of the mixture gas in the LPG bomb). Therefore, in a case where the material gas from the LPG bomb is used as the combustion fuel of the combustor 14 at the time of the start-up of the fuel cell system 200, appropriately estimating the composition of the material gas and setting the flow rate of the air to the combustor 14 to a value corresponding to the composition of the material gas are important for the ignition stability of the combustor 14.

Hereinafter, one example of the estimation of the composition of the material gas will be explained.

Table 1 shows the component ratios (%) of the propane, the isobutane, and the normal butane, which change in accordance with the use amount (%) of the LPG bomb and a combustion amount (combustion amount of the mixture gas per unit volume) of the combustor 4 in a case where the mixture gas constituted by the propane, the isobutane, and the normal butane is sealed in the LPG bomb.

TABLE 1

| | Use rate of bomb (%) | Propane (%) | Isobutane (%) | Normal butane (%) | Combustion amount of combustor (watts/liter) |
|---|---|---|---|---|---|
| 1 | 0.00 | 57.03 | 25.67 | 17.31 | 31.01 |
| 2 | 1.84 | 56.92 | 25.81 | 17.28 | 31.02 |
| 3 | 3.68 | 56.16 | 26.14 | 17.70 | 31.08 |
| 4 | 5.51 | 55.37 | 26.59 | 18.04 | 31.15 |
| 5 | 9.50 | 54.14 | 27.21 | 18.65 | 31.25 |
| 6 | 11.34 | 53.29 | 27.67 | 19.04 | 31.32 |
| 7 | 15.01 | 52.48 | 28.10 | 19.42 | 31.38 |
| 8 | 16.85 | 51.06 | 28.78 | 20.16 | 31.50 |
| 9 | 20.53 | 49.72 | 29.47 | 20.81 | 31.61 |
| 10 | 24.20 | 48.25 | 30.22 | 21.54 | 31.73 |
| 11 | 31.37 | 45.78 | 31.40 | 22.82 | 31.93 |
| 12 | 35.05 | 43.85 | 32.29 | 23.86 | 32.08 |
| 13 | 40.87 | 41.31 | 33.47 | 25.23 | 32.29 |
| 14 | 46.08 | 38.50 | 34.74 | 26.76 | 32.52 |
| 15 | 49.75 | 36.09 | 35.79 | 28.12 | 32.71 |
| 16 | 53.43 | 33.65 | 36.79 | 29.56 | 32.91 |
| 17 | 55.88 | 31.18 | 37.79 | 31.03 | 33.11 |
| 18 | 58.64 | 29.66 | 38.39 | 31.95 | 33.23 |
| 19 | 65.07 | 25.70 | 39.84 | 34.46 | 33.56 |
| 20 | 71.51 | 20.79 | 41.32 | 37.89 | 33.95 |
| 21 | 77.63 | 16.04 | 42.46 | 41.50 | 34.34 |
| 22 | 86.52 | 9.85 | 42.93 | 47.21 | 34.84 |
| 23 | 90.20 | 6.75 | 42.02 | 51.22 | 35.10 |
| 24 | 95.10 | 3.63 | 39.38 | 56.99 | 35.35 |
| 25 | 97.55 | 2.17 | 35.57 | 62.26 | 35.47 |

As shown in Table 1, the component ratios of the propane, the isobutane, and the normal butane in the mixture gas can be found out based on the combustion amount of the combustor 14.

Figure 3:
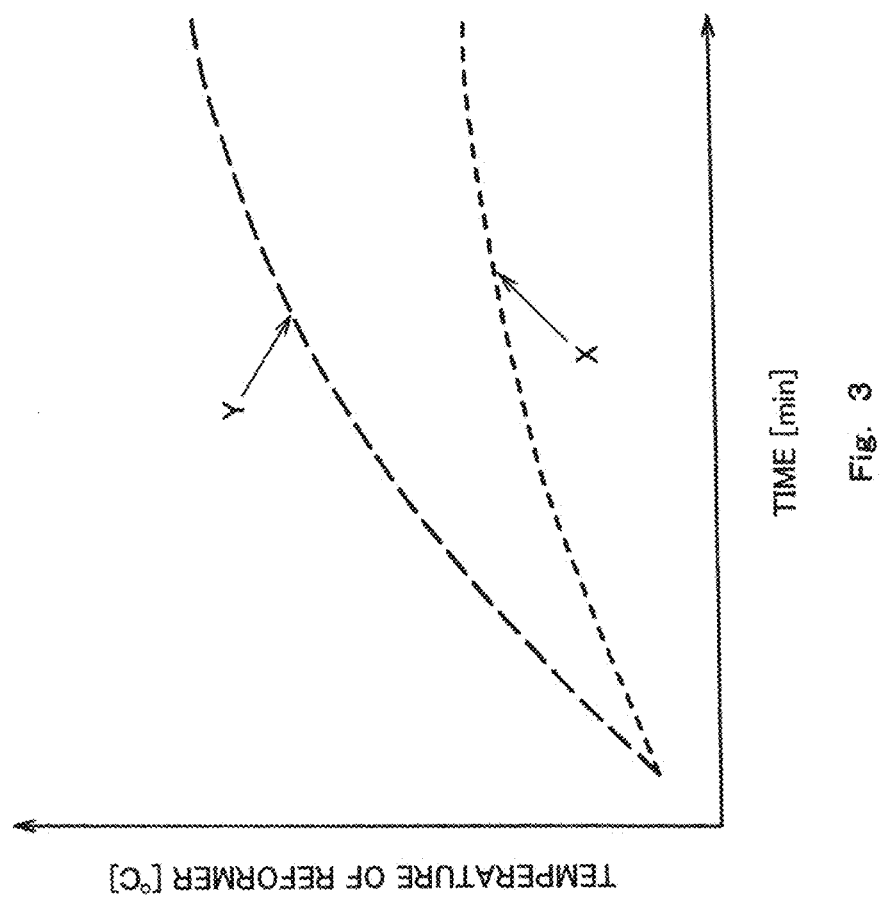
FIG. 3 is a diagram schematically showing one example of a relationship between a change in the composition of the material gas and the temperature of a reformer.

As shown in FIG. 3, the combustion amount of the combustor 14 can be predicted from the temperature rise of the reformer 6. In FIG. 3, X shows one example of a temperature rise profile of the reformer 6 in a case where the remaining amount of the gas in the LPG bomb is 100% (i.e., in a case where the component ratio of the propane in the mixture gas is high), and Y shows one example of the temperature rise profile of the reformer 6 in a case where the remaining amount of the gas in the LPG bomb is 0% (i.e., in a case where the component ratio of the propane in the mixture gas is low).

As shown in FIG. 3, a temperature rise rate of the reformer 6 shown by Y is higher than that shown by X. It can be understood that such a difference between these temperature rise profiles is caused since the combustion amounts of the combustor 14 in respective cases are different from each other as shown in Table 1.

As above, even in a case where the component ratios of the propane and butane of the mixture gas (the composition of the material gas) change, the changes in the component ratios in the mixture gas can be found out based on a temperature rise value of the reformer 6.

The above type of material gas is just one example, and the present embodiment is not limited to this example. For example, the propane and the butane have been explained herein. However, even in the case of the mixture gas containing the other combustible component (such as methane), the changes in the component ratios in the mixture gas can be found out in the same manner as above.

Operations

Figure 4:
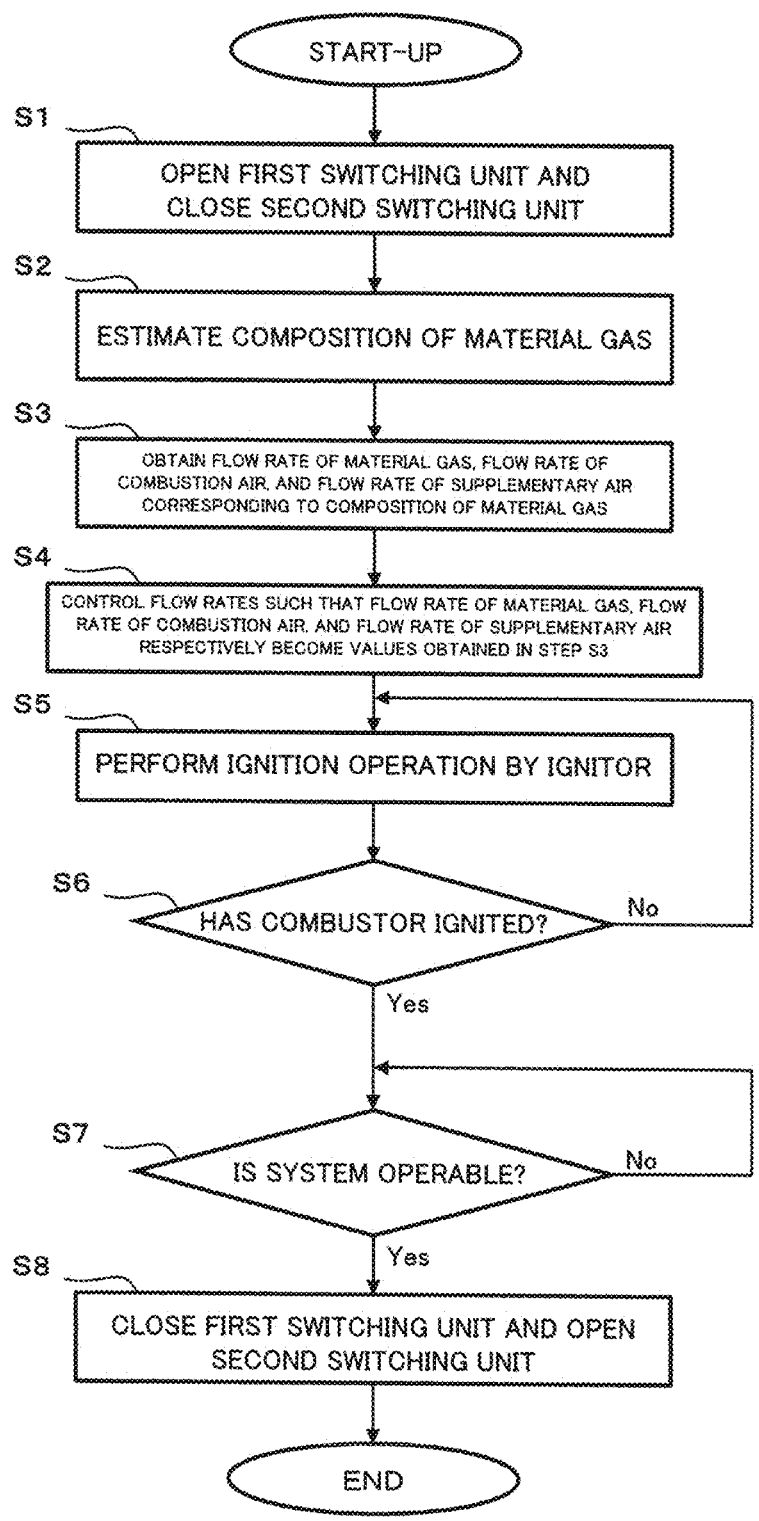
FIG. 4 is a flow chart showing one example of operations of the fuel cell system of Embodiment 1.

FIG. 4 is a flow chart showing one example of the operations of the fuel cell system of Embodiment 1. Hereinafter, the operations of the fuel cell system 200 will be explained in reference to FIG. 4. The following operations are performed by the control of the controller 30.

At the time of the start-up of the fuel cell system 200, in Step S1, the first switching unit 20*a* opens, and the second switching unit 20*b* closes. With this, the supply of the off gas from the anode of the fuel cell 22 to the combustor 14 is stopped, and the material gas is supplied from the material gas supply unit 25 to the combustor 14.

Next, in Step S2, the composition of the material gas is estimated. For example, a predetermined amount of material gas is supplied from the material gas supply unit 25 to the combustor 14 to be combusted in the combustor 14. At this time, the heat of the combustor 14 is transferred to the reformer 6, so that the temperature of the reformer 6 increases. Therefore, a temperature rise value ΔT of the reformer 6 per unit time can be obtained by using the temperature detector 18. On this account, based on the temperature rise value ΔT, the combustion amount of the combustor 14 (combustion amount of the material gas per unit volume) can be obtained. Then, the composition of the material gas at present is estimated from data indicating a correspondence relation between the combustion amount of the combustor 14 and the composition of the material gas. One example of the data indicating the above correspondence relation is a table showing a relationship between the combustion amount of the combustor 14 and the amount of carbon in the raw material per unit amount.

The method of estimating the composition of the material gas in Step S2 is just one example, and the present embodiment is not limited to this example.

Next, in Step S3, the flow rate of the material gas, the flow rate of the combustion air, and the flow rate of the supplementary air corresponding to the composition of the material gas estimated in Step S2 are obtained. For example, if the flow rate of the material gas is set to a predetermined rate, an optimal air flow rate, which realizes a theoretical air-fuel ratio in the combustor 14, relative to the flow rate of the material gas can be found out based on the composition of the material gas estimated in Step S2. By dividing the optimal air flow rate between the flow rate of the combustion air and the flow rate of the supplementary air at an appropriate ratio, the flow rate of the combustion air and the flow rate of the supplementary air can be specified. For example, in a case where the optimal air flow rate is 1.0 liter/minute, it can be divided such that the flow rate of the combustion air is 0.8 liter/minute, and the flow rate of the supplementary air is 0.2 liter/minute.

Those values, such as the air flow rate, in Step S3 are just examples, and the present embodiment is not limited to the examples.

In Step S4, the flow rate of the material gas, the flow rate of the combustion air, and the flow rate of the supplementary air are controlled by the material gas supply unit 25, the combustion air flow rate adjuster 15, and the supplementary air flow rate adjuster 16 such that the flow rates of the gases respectively become the values obtained in Step S3.

Next, the ignition operation of the combustor 14 is performed by the ignitor 17 in Step S5, and whether or not the combustor 14 has ignited is determined by using the second detector 19 in Step S6.

In a case where the combustor 14 did not ignite, the ignition operation in Step S5 is repeatedly performed a predetermined number of times.

In a case where the combustor 14 has ignited, the process proceeds to Step S7, and whether or not the fuel cell system 200 is in an operable state is determined. For example, in Step S7, whether or not the temperature of the reforming catalyst in the reformer 6 has reached the temperature (for example, about 600° C. to 700° C.) appropriate for the reforming reaction is determined.

In a case where the temperature of the reforming catalyst in the reformer 6 has reached the temperature (for example, about 600° C. to 700° C.) appropriate for the reforming reaction, in Step S8, the first switching unit 20a closes, and the second switching unit 20b opens. With this, the supply of the off gas from the anode of the fuel cell 22 to the combustor 14 is started, and the supply of the material gas from the material gas supply unit 25 to the combustor 14 is stopped. Then, the reformer 6 starts generating the hydrogen-containing gas by the reforming reaction of the material gas. The fuel cell 22 starts generating electric power by using the hydrogen-containing gas supplied from the hydrogen generator 100.

Thus, the start-up operation of the fuel cell system 200 is terminated, and the operation of the fuel cell system 200 starts.

As above, in the present embodiment, an appropriate amount of supplementary air is added to the material gas at the time of the start-up of the fuel cell system 200. Therefore, an apparent flow velocity of the material gas supplied to the combustor 14 can be increased without increasing the concentration of the material gas supplied to the combustor 14. On this account, the diffusivity of the material gas to the combustor 14 improves, so that the ignition of the combustor 14 can be stably performed.

By estimating the composition of the material gas, the flow rate of the air to the combustor 14 can be controlled to become an optimal value corresponding to the composition of the material gas, so that the ignition of the combustor 14 can be stably performed.

Embodiment 2

Device Configuration

The fuel cell system 200 of the present embodiment has the same configuration as in FIG. 1 and includes the hydrogen generator 100, the cathode air supply unit 26, and the fuel cell 22. The hydrogen generator 100 has the same configuration as in FIG. 1 and includes the reformer 6, the combustor 14, the combustion air flow rate adjuster 15, the supplementary air flow rate adjuster 16, the ignitor 17, the first detector 18, the second detector 19, the first switching unit 20a, the second switching unit 20b, the air supply unit 24, the material gas supply unit 25, and the controller 30. Therefore, since these configurations are the same as those in Embodiment 1, detailed explanations thereof are omitted.

Operations

Figure 5:
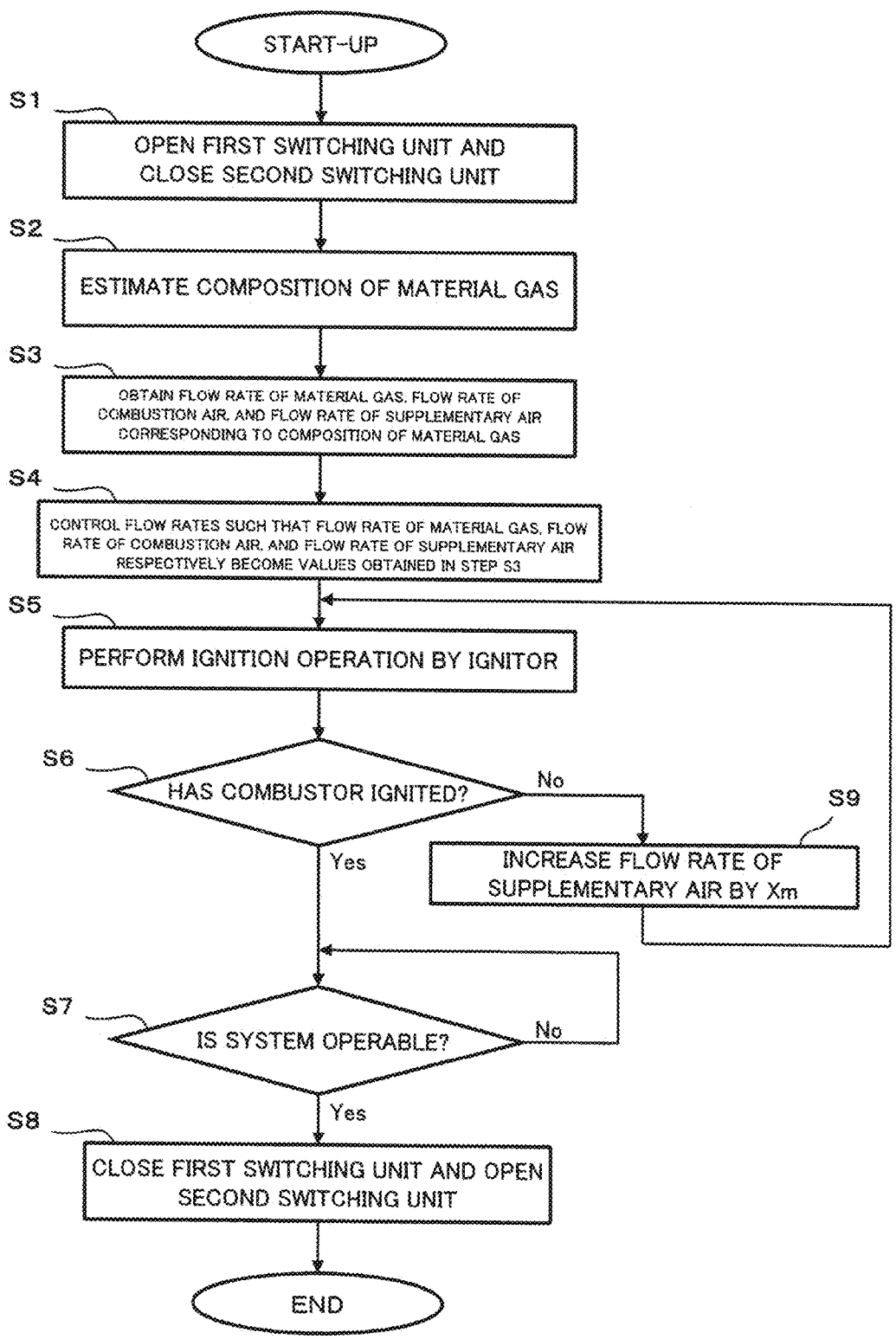
FIG. 5 is a flow chart showing one example of the operations of the fuel cell system of Embodiment 2.

FIG. 5 is a flow chart showing one example of the operations of the fuel cell system of Embodiment 2. Hereinafter, the operations of the fuel cell system 200 will be explained in reference to FIG. 5. The following operations are performed by the control of the controller 30. In a case where the combustor 14 did not ignite, the diffusion of the material gas to the combustor 14 is inadequate in many cases.

Here, in the present embodiment, the determination of the ignition of the combustor 14 is performed by using the second detector 19 in Step S6. In a case where the combustor 14 did not ignite, the flow rate of the supplementary air is increased by a predetermined flow rate Xm in Step S9 before the ignition operation is repeatedly performed in Step S5. For example, in a case where the initial flow rate of the supplementary air is 0.2 liter/minute, and the predetermined flow rate Xm is 0.2 liter/minute, the flow rate of the supplementary air is increased to 0.4 liter/minute.

The value of the flow rate of the supplementary air and the value of the predetermined flow rate Xm in Step S9 are just examples, and the present embodiment is not limited to these examples.

Except for the above operations, the operations of the fuel cell system 200 of the present embodiment are the same as the operations of the fuel cell system 200 of Embodiment, so that explanations thereof are omitted.

As above, in the present embodiment, in a case where the combustor 14 did not ignite at the time of the start-up of the fuel cell system 200, the supplementary air flow rate adjuster 16 is controlled such that the flow rate of the supplementary air is increased stepwisely. Therefore, the apparent flow velocity of the material gas supplied to the combustor 14 becomes further higher than that in Embodiment 1. Thus, the diffusivity of the material gas to the combustor 14 further improves, so that the ignition of the combustor 14 can be stably performed.

Modification Example

In Embodiment 2, when the flow rate of the supplementary air is increased by the predetermined flow rate Xm in Step S9, the flow rate of the combustion air is being fixed. Therefore, the flow rate of the air supplied to the combustor 14 becomes higher by the predetermined flow rate Xm than the optimal air flow rate, which realizes the theoretical air-fuel ratio in the combustor 14, relative to the flow rate of the material gas.

In Modification Example, in order that the air can be supplied at the air flow rate which realizes the theoretical air-fuel ratio in the combustor 14, in a case where the flow rate of the supplementary air is increased by the predetermined flow rate Xm, the flow rate of the combustion air is decreased by the predetermined flow rate Xm.

In the present modification example, as with Embodiment 2, the apparent flow velocity of the material gas supplied to the combustor 14 becomes further higher than that in Embodiment 1. Thus, the diffusivity of the material gas to the combustor 14 further improves, so that the ignition of the combustor 14 can be stably performed.

Embodiment 3

Device Configuration

The fuel cell system 200 of the present embodiment has the same configuration as in FIG. 1 and includes the hydrogen generator 100, the cathode air supply unit 26, and the fuel cell 22. The hydrogen generator 100 has the same configuration as in FIG. 1 and includes the reformer 6, the combustor 14, the combustion air flow rate adjuster 15, the supplementary air flow rate adjuster 16, the ignitor 17, the first detector 18, the second detector 19, the first switching unit 20a, the second switching unit 20b, the air supply unit 24, the material gas supply unit 25, and the controller 30. Therefore, since the configurations are the same as those in Embodiment 1, detailed explanations thereof are omitted.

Operations

Figure 6:
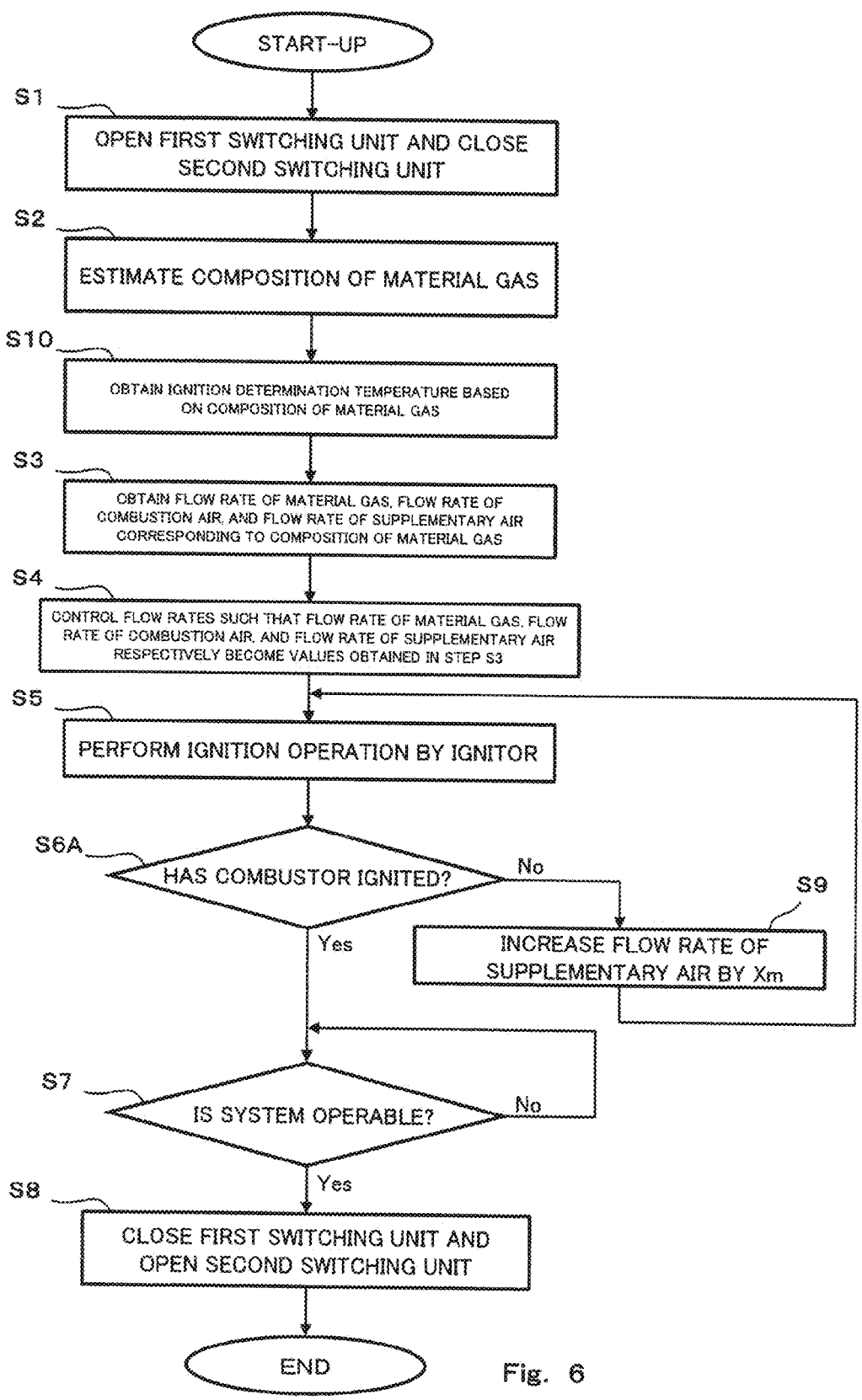
FIG. 6 is a flow chart showing one example of the operations of the fuel cell system of Embodiment 3.

FIG. 6 is a flow chart showing one example of the operations of the fuel cell system of Embodiment 3. Hereinafter, the operations of the fuel cell system 200 will be explained in reference to FIG. 6. The following operations are performed by the control of the controller 30.

For example, in a case where the LPG bomb in which the propane and the butane are sealed is used as the material gas supply source, the ignition temperatures of the propane and the butane are different from each other.

In the present embodiment, in Step S10, the ignition determination temperature is obtained based on the composition of the material gas estimated in Step S2. In Step S6A, a temperature detector, such as a thermocouple, is used as the second detector 19, and whether or not the combustor 14 has ignited is determined based on the comparison between the temperature detected by the second detector 19 and the ignition determination temperature obtained in Step S6.

Except for the above operations, the operations of the fuel cell system 200 of the present embodiment are the same as the operations of the fuel cell system 200 of Embodiment 2, so that explanations thereof are omitted.

As above, in the present embodiment, whether or not the combustor 14 has ignited is determined based on the comparison between the temperature detected by the second detector 19 and the ignition determination temperature obtained in Step S10. Therefore, even in a case where the composition of the material gas changes, the reliability of the ignition determination of the combustor 14 can be maintained.

Embodiment 4

Device Configuration

The fuel cell system 200 of the present embodiment has the same configuration as in FIG. 1 and includes the hydrogen generator 100, the cathode air supply unit 26, and the fuel cell 22. The hydrogen generator 100 has the same configuration as in FIG. 1 and includes the reformer 6, the combustor 14, the combustion air flow rate adjuster 15, the supplementary air flow rate adjuster 16, the ignitor 17, the first detector 18, the second detector 19, the first switching unit 20a, the second switching unit 20b, the air supply unit 24, the material gas supply unit 25, and the controller 30. Therefore, since the configurations are the same as those in Embodiment 1, detailed explanations thereof are omitted.

Relationship Between Temperature of Reformer and Composition of Material Gas

During the operation of the fuel cell system 200, the reforming reaction (endothermic reaction) is occurring in the reformer 6. Therefore, when evaluating the relationship between the temperature of the reformer 6 and the composition of the material gas, the amount of reforming reaction energy in the reformer 6 needs to be considered.

Table 2 shows one example of the amount of reforming reaction energy of the reformer 6 per unit volume of each of the propane and the butane and the generated heat amount of the combustor 14 per unit volume of each of the propane and the butane. In Table 2, data regarding the butane shows average values between data regarding the isobutane and data regarding the normal butane.

It is clear from Table 2 that the amount of reforming reaction energy of the butane is larger than that of the propane, and further, the combustion amount of the butane is larger than that of the propane. With this, when the component ratio of the butane in the mixture gas is high, the temperature rise rate of the reformer 6 is high. Therefore, the data show in Table 2 indicates the same tendency as the temperature rise profile of the reformer 6 of FIG. 3.

As above, even in a case where the component ratios of the propane and butane in the mixture gas (the composition of the material gas) change during the operation of the fuel cell system 200, the changes in the component ratios in the mixture gas can be found out based on the temperature rise value of the reformer 6 per unit time.

The above type of material gas is just one example, and the present embodiment is not limited to this example. For example, the propane and the butane have been explained herein. However, even in the case of the mixture gas containing the other combustible component (such as methane), the changes in the component ratios in the mixture gas can be found out in the same manner as above.

TABLE 2

| Compound name | Chemical formula | Amount of reforming reaction energy [KJ/Nm$^3$] | Combustion amount [MJ/Nm$^3$] |
|---|---|---|---|
| Propane | C$_3$H$_8$ | 17 | 102 |
| Butane | C$_4$H$_{10}$ | 22 | 134 |

Operations

Figure 7:
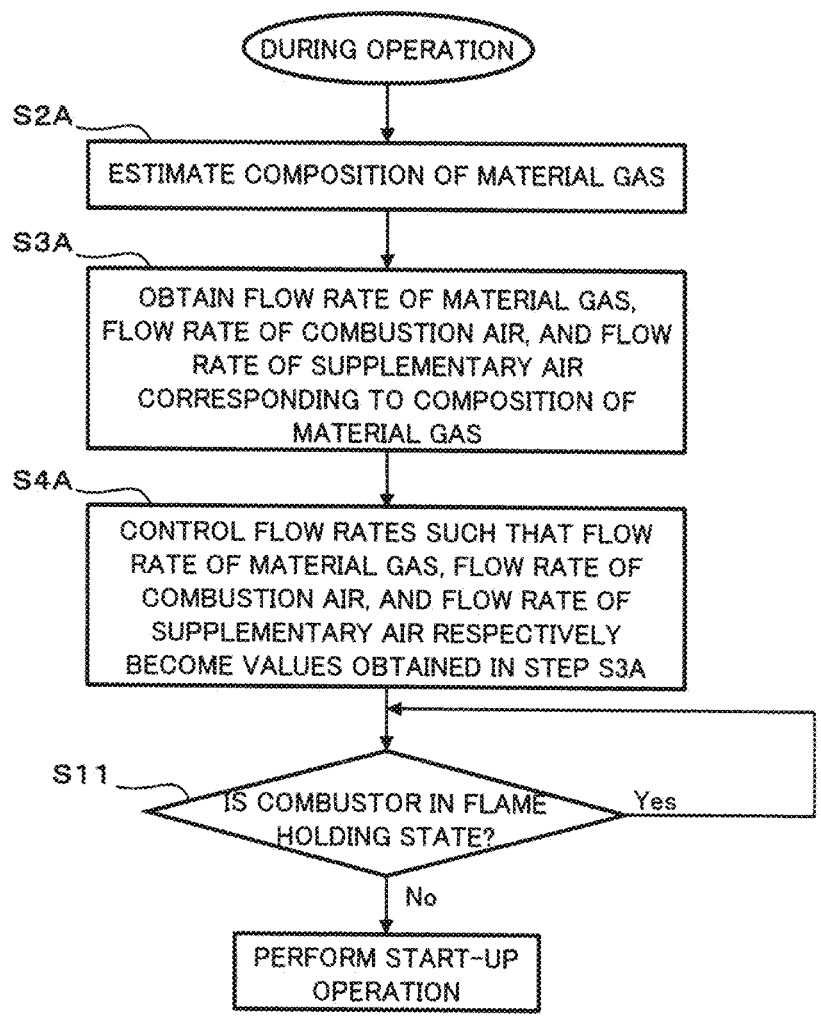
FIG. 7 is a flow chart showing one example of the operations of the fuel cell system of Embodiment 4.

FIG. 7 is a flow chart showing one example of the operations of the fuel cell system of Embodiment 4. Hereinafter, the operations of the fuel cell system 200 will be explained in reference to FIG. 7. The following operations are performed by the control of the controller 30.

An estimation mode of the composition of the material gas is selected during the operation of the fuel cell system 200. This mode may be selected every certain period (for example, every 100 hours) or may be selected every time a certain amount (for example, 100 liters) of material gas is used.

In a case where the estimation mode of the composition of the material gas is selected, the composition of the material gas is estimated in Step S2A. Since details of the operation in Step S2A can be easily understood from the explanation of the operation in Step 2 of Embodiment 1, explanations thereof are omitted.

Next, in Step S3A, the flow rate of the material gas, the flow rate of the combustion air, and the flow rate of the supplementary air corresponding to the composition of the material gas estimated in Step S2A are obtained. For example, during the operation of the fuel cell system 200, the flow rate of the material gas is set to a predetermined rate corresponding to the output of the fuel cell 22. Thus, the optimal air flow rate, which realizes the theoretical air-fuel ratio in the combustor 14, relative to the flow rate of the material gas can be found out based on the composition of the material gas estimated in Step S2A. By dividing the optimal air flow rate between the flow rate of the combustion air and the flow rate of the supplementary air at an appropriate ratio, the flow rate of the combustion air and the flow rate of the supplementary air can be specified.

In Step S4A, the flow rate of the material gas, the flow rate of the combustion air, and the flow rate of the supplementary air are controlled by the material gas supply unit 25, the combustion air flow rate adjuster 15, and the supplementary air flow rate adjuster 16 such that the flow rates of the gases respectively become the values obtained in Step S3A. For example, FIG. 8 is a diagram schematically showing one example of the flow rate of the material gas, the flow rate of the combustion air, and the flow rate of the supplementary air at the time of the start-up of the fuel cell system and during the operation of the fuel cell system.

Figure 8:
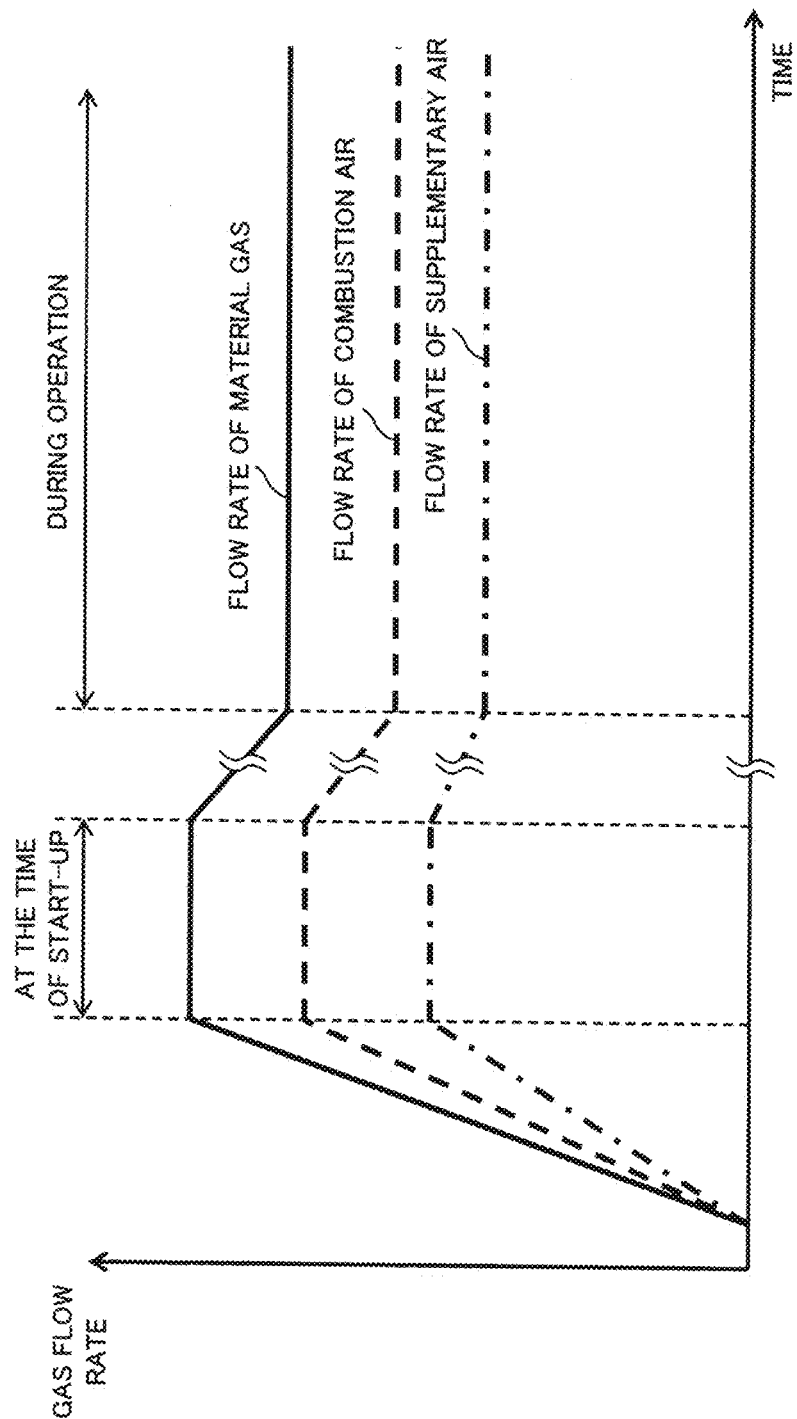
FIG. 8 is a diagram schematically showing one example of the flow rate of the material gas, the flow rate of combustion air, and the flow rate of supplementary air at the time of start-up of the fuel cell system and during the operation of the fuel cell system.

As shown in FIG. 8, the above flow rates of the gases are different between at the time of the start-up of the fuel cell system 200 and during the operation of the fuel cell system 200. At the time of the start-up, the flow rate of the material gas, the flow rate of the combustion air, and the supplementary air are set to be high in order to improve the diffusivity of the material gas to the combustor 14. In contrast, during the operation, the flow rate of the material gas, the flow rate of the combustion air, and the flow rate of the supplementary air are respectively set to appropriate flow rates, lower than the flow rates at the time of the start-up, so as to correspond to the output of the fuel cell 22.

Next, in Step S11, whether or not the combustor 14 is in the flame holding state is determined by using the second detector 19. In a case where the combustor 14 is not in the flame holding state, the start-up operation of the fuel cell system 200 is performed.

As above, in the present embodiment, the composition of the material gas is estimated during the operation of the fuel cell system 200. With this, the flow rate of the air to the combustor 14 can be controlled to become an optimal value corresponding to the composition of the material gas. Therefore, the fuel cell system 200 can be stably operated.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

INDUSTRIAL APPLICABILITY

The hydrogen generator according to one aspect of the present invention can more stably perform the ignition of the combustor than before. Therefore, the aspect of the present invention can be utilized in, for example, fuel cell systems.

REFERENCE SIGNS LIST 6 reformer
14 combustor
15 combustion air flow rate adjuster
16 supplementary air flow rate adjuster
17 ignitor
18 first detector
19 second detector
20a first switching unit
20b second switching unit
22 fuel cell
24 air supply unit
25 material gas supply unit
26 cathode air supply unit
30 controller
100 hydrogen generator
200 fuel cell system

The invention claimed is:

1. A hydrogen generator comprising:
   a material gas supply source configured to supply a material gas from which a hydrogen-containing gas is generated:
   a reformer configured to generate the hydrogen-containing gas by a reforming reaction of the material gas supplied via a first material gas passage connected between the reformer and the material gas supply source:
   a combustor configured to heat the reformer by diffusion combustion of combustion air and the material gas supplied via a second material gas passage connected between the combustor and the material gas supply source;
   an air flow rate adjuster configured to adjust a flow rate of air supplied to the combustor; a supplementary air flow rate adjuster configured to adjust a flow rate of supplementary air added to the material gas that is supplied to the combustor; and
   a controller programmed to control the supplementary air flow rate adjuster such that a flow rate of a mixture gas of the material gas and the supplementary air becomes a predetermined value,
   wherein the supplementary air flow rate adjustor is disposed on a supplementary air passage and the supplementary air passage is connected to the second material gas passage prior to a connection of the second material gas passage to the combustor, and
   wherein the combustor and the reformer are in direct thermal communication.

2. The hydrogen generator according to claim 1, further comprising a first detector configured to detect composition of the material gas, wherein
   the controller is further programmed to control the supplementary air flow rate adjuster based on the composition of the material gas.

3. The hydrogen generator according to claim 2, wherein in a case where the combustor did not ignite at the time of start-up, the controller is further programmed to control the supplementary air flow rate adjuster so as to stepwisely increase the flow rate of the supplementary air.

4. The hydrogen generator according to claim 1, wherein in a case where the combustor did not ignite at the time of start-up, the controller is further programmed to control the supplementary air flow rate adjuster so as to stepwisely increase the flow rate of the supplementary air.

5. The hydrogen generator according to claim 1, further comprising:
   a first detector configured to detect composition of the material gas; and
   a second detector configured to detect a temperature inside the combustor, wherein
   the controller is further programmed to obtain an ignition determination temperature based on the composition of the material gas and then determine whether or not the combustor has ignited, based on a comparison between the temperature detected by the second detector and the ignition determination temperature.

6. The hydrogen generator according to claim 1, wherein the air, of which air flow rate is adjusted by the air flow rate adjuster, is supplied to the combustor without being mixed with the material gas.

7. The hydrogen generator according to claim 1, wherein:
the second material gas passage is a material gas branch passage that branches from the first material gas passage.

* * * * *